United States Patent
Dufaux et al.

(10) Patent No.: US 7,643,657 B2
(45) Date of Patent: Jan. 5, 2010

(54) SYSTEM FOR SELECTING A KEYFRAME TO REPRESENT A VIDEO

(75) Inventors: Frederic Dufaux, Chestnut Hill, MA (US); Michael J. Swain, Newton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 10/899,838

(22) Filed: Jul. 26, 2004

(65) Prior Publication Data
US 2005/0002452 A1 Jan. 6, 2005

Related U.S. Application Data

(63) Continuation of application No. 09/248,525, filed on Feb. 9, 1999, now Pat. No. 6,782,049, which is a continuation-in-part of application No. 09/239,937, filed on Jan. 29, 1999, now abandoned.

(51) Int. Cl.
*G06K 9/00* (2006.01)
*H04N 5/91* (2006.01)

(52) U.S. Cl. .......................... 382/115; 386/46; 386/124

(58) Field of Classification Search .................. 386/46, 386/52, 95, 124; 707/104.1; 382/115, 164, 382/168, 171–173; 375/240.01, 240.16; 348/699–702
See application file for complete search history.

(56) References Cited

U.S. PATENT DOCUMENTS

| | | | |
|---|---|---|---|
| 5,485,611 A | 1/1996 | Astle | |
| 5,600,775 A | 2/1997 | King et al. | |
| 5,635,982 A | 6/1997 | Zhang et al. | |
| 5,821,945 A | 10/1998 | Yeo et al. | |
| 5,923,376 A * | 7/1999 | Pullen et al. | 375/240.16 |
| 5,956,026 A | 9/1999 | Ratakonda | |
| 5,995,095 A | 11/1999 | Ratakonda | |
| 6,014,183 A | 1/2000 | Hoang | |
| 6,195,458 B1 | 2/2001 | Warnick et al. | |
| 6,263,088 B1 | 7/2001 | Crabtree et al. | |
| 6,278,446 B1 | 8/2001 | Liou et al. | |
| 6,331,859 B1 | 12/2001 | Crinon | |
| 6,366,296 B1 | 4/2002 | Boreczky et al. | |
| 6,389,168 B2 | 5/2002 | Altunbasak et al. | |
| 6,535,254 B1 * | 3/2003 | Olsson et al. | 348/607 |
| 2002/0054083 A1 | 5/2002 | Boreczky et al. | |

OTHER PUBLICATIONS

Frankel, C., et al., "WebSeer: An Image Search Engine for the World Wide Web," (Report No. 96-14). Chicago, IL: University of Chicago Computer Science Department. (Aug. 1, 1996).

(Continued)

*Primary Examiner*—Thai Tran
*Assistant Examiner*—Mishawn Dunn (57) ABSTRACT

A key frame representative of a sequence of frames in a video file is selected. The sequence of frames is divided into shots, sequences of frames captured by a single continuous operation of the camera, by detecting shot boundaries. Shot boundaries are detected by measuring changes in motion activity between frames using measures of pixel intensity and histogram differences between frames. The most interesting shot in the sequence of frames is selected using measures of motion activity, spatial activity, skin pixel color and shot length. The key frame is selected in the most interesting shot using measures of spatial activity and motion activity.

34 Claims, 11 Drawing Sheets

OTHER PUBLICATIONS

Smith, J.R., and Chang, S., "Searching for Images and Videos on the World-Wide Web," (Report No. 459-96-25). New York, NY: Columbia University Dept. of Electrical Engineering and Center for Image Technology for New Media. (Aug. 19, 1996).

Yeo, B., and Liu, B., "Rapid Scene Analysis on Compressed Video," *IEEE Transactions on Circuits and Systems for Video Technology*, 5(6):533-544 (Dec. 1995).

Naphade, M.R., et al., "A High-Performance Shot Boundary Detection Algorithm Using Multiple Cues," *IEEE*, 4 pages, Jan. 29, 1999.

Zhuang, Y., "Adaptive Key Frame Extraction using Unsupervised Clustering," *IEEE*, 5 pages, Jan. 29, 1999.

"Scour.Net Web Site Offers First Multimedia Search Engine and Guide," [online] Aug. 18, 1998, [retrieved Feb. 9, 1999] Los Angeles, CA: Scour, Inc. company press release. Retrieved from the Internet <URL: http://scour.net/company/press-release-Aug-18-1998.phtml>.

Zhang, H.Z. et al., "A Video Database System for Digital Libraries," in *Advance in Digital Libraries*, Lecture Notes in Computer Science, Chapter 15, p. 321, Springer Verlag, 1995.

Zhang, H.Z. et al., "Automatic partitioning of full-motion video," Multimedia Systems, vol. 1, pp. 10-28, Jul. 1993.

* cited by examiner

SYSTEM FOR SELECTING A KEYFRAME TO REPRESENT A VIDEO

RELATED APPLICATIONS

This application is a continuation of U.S. patent application Ser. No. 09/248,525 filed, Feb. 9, 1999 now U.S. Pat. No. 6,782,049, which is a continuation-in-part of patent application Ser. No. 09/239,937 entitled "A System for Indexing World Wide Web Multimedia" by Frederic Dufaux et al., filed on Jan. 29, 1999 now abandoned. The entire teachings of the above applications are incorporated herein by reference.

BACKGROUND OF THE INVENTION

The World Wide Web ("WWW") is comprised of millions of documents (web pages) formatted in Hypertext Markup Language ("HTML"), which can be accessed from thousands of users through the Internet. To access a web page, its Uniform Resource Locator ("URL") must be known. Search engines index web pages and make those URLs available to users of the WWW. To generate an index, a search engine, such as Compaq Computer Corporation's ALTA VISTA search engine, may search the WWW for new web pages using a web crawler. The search engine selects relevant information from a web page after analyzing the content of the web page and saves the relevant information and the web page's URL in the index.

Web pages also contain links to other documents on the WWW, for example, text documents and image files. By searching web pages for links to image files, a search engine connected to the WWW, such as Compaq Computer Corporation's ALTA VISTA Photo Finder, provides an index of image files located on the WWW. The index contains a URL and a representative image from the image file.

Web pages also contain links to multimedia files, such as video and audio files. By searching web pages for links to multimedia files, a multimedia search engine connected to the WWW, such as Scour Inc.'s SCOUR.NET, provides an index of multimedia files located on the WWW. SCOUR.NET's index for video files provides text describing the contents of the video file and the URL for the multimedia file. Another multimedia search engine, WebSEEK, summarizes a video file by generating a highly compressed version of the video file. The video file is summarized by selecting a series of frames from shots in the video file and repackaging the frames as an animated GIF file. WebSEEK also generates a color histogram from each shot in the video to automatically classify the video file and allow content-based visual queries. It is described in John R. Smith et al. "An Image and Video Search Engine for the World-Wide Web", Symposium on Electronic Imaging: Science and Technology—Storage and Retrieval for Image and Video Databases V, San Jose, Calif., February 1997, IS&T/SPIE.

Analyzing the contents of digital video files linked to web pages is difficult because of the low quality and low resolution of the highly compressed digital video files.

SUMMARY OF THE INVENTION

The present invention provides a mechanism for efficiently indexing video files and has particular application to indexing video files located by a search engine web crawler. A key frame, one frame representative of a video file, is extracted from the sequence of frames. The sequence of frames may include multiple scenes or shots, for example, continuous motions relative to a camera separated by transitions, cuts, fades and dissolves. To extract a key frame, shot boundaries are detected in the sequence of frames, a key shot is selected from shots within the detected shot boundaries, and the key frame is determined in the selected key shot.

In preferred embodiments, the shot boundaries are detected based on the result of a first test or a second test which are dependent on backward and forward discontinuities of pixel-wise differences between successive frames and on a distribution of a luminance histogram for each frame. The first test determines if the greater of the forward discontinuity and the backward discontinuity of a frame, in relation to the luminance histogram of the frame, is greater than a first threshold value. The second test determines if the greater of the forward discontinuity and the backward discontinuity in pixel wise frame difference of a frame in relation to the luminance histogram is greater than a second threshold value or the result of a first test if the maximum discontinuity in pixel-wise frame difference of the frame in relation to the luminance histogram of the frame is greater than the second lesser threshold and the minimum discontinuity in pixel-wise frame difference in relation to the luminance histogram is less than a third threshold value less than the second threshold value.

The key shot is selected based on the level of skin color pixels, motion between frames, spatial activity between frames and shot length. The key frame is selected based on frame activity: spatial activity within a frame and motion between frames.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
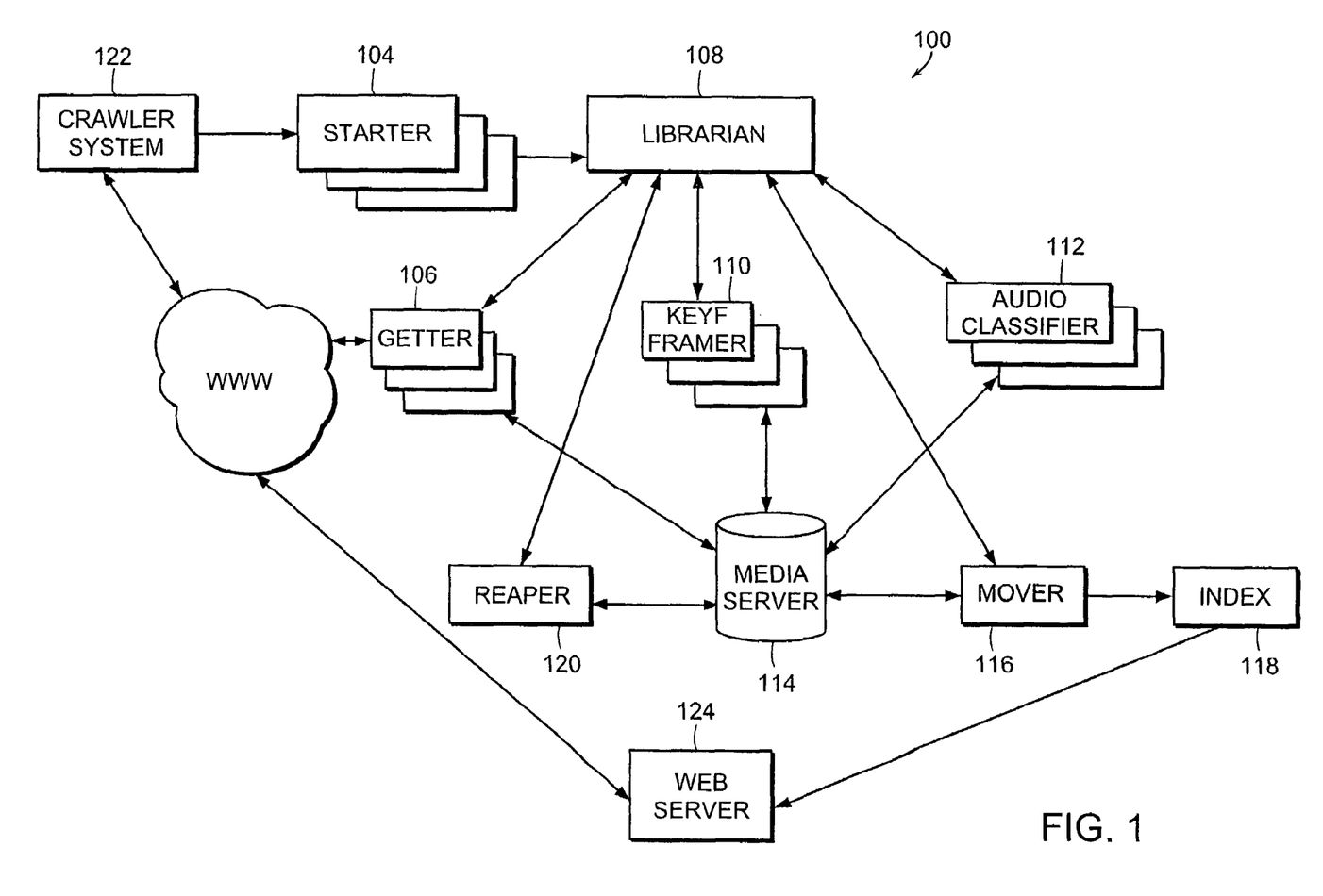
FIG. 1 illustrates components of a multimedia search engine connected to the World Wide Web for generating an index of multimedia files including an extracted key frame for a video file.

FIG. 1 illustrates a WWW-connected search engine including a webcrawler 122, a web server 124 for allowing web users to access an index 118, and a multimedia index system 100 for creating the index 118 of multimedia files. The crawler system 122, separate from the multimedia index system 100, is connected to the WWW and crawls the WWW searching for web pages containing URLs to multimedia files. The crawler system extracts key text, determined to be relevant, from the web page and stores the text, the web page's URL, and the URLs of any multimedia files found on the web page. The components of the multimedia index system 100 for extracting representations of the multimedia files and classifying files include a librarian 108 for keeping track of data and controlling workflow in the system, daemons 104, 106, 110, 112, 116, and 120 for performing work in the system and a media server 114.

The librarian 108 is a relational database. The daemons query the librarian 108 for work to perform and add to the librarian 108 work for other daemons to perform. The system daemons include a starter daemon 104, a getter daemon 106, a keyframer daemon 110, an audio classifier daemon 112, a reaper daemon 120 and a mover daemon 116. There may be multiple copies of each type of daemon, allowing the system to scale to index a large number of multimedia files. The operation of the components of the multimedia index system 100 is described in conjunction with FIG. 2.

Figure 2:
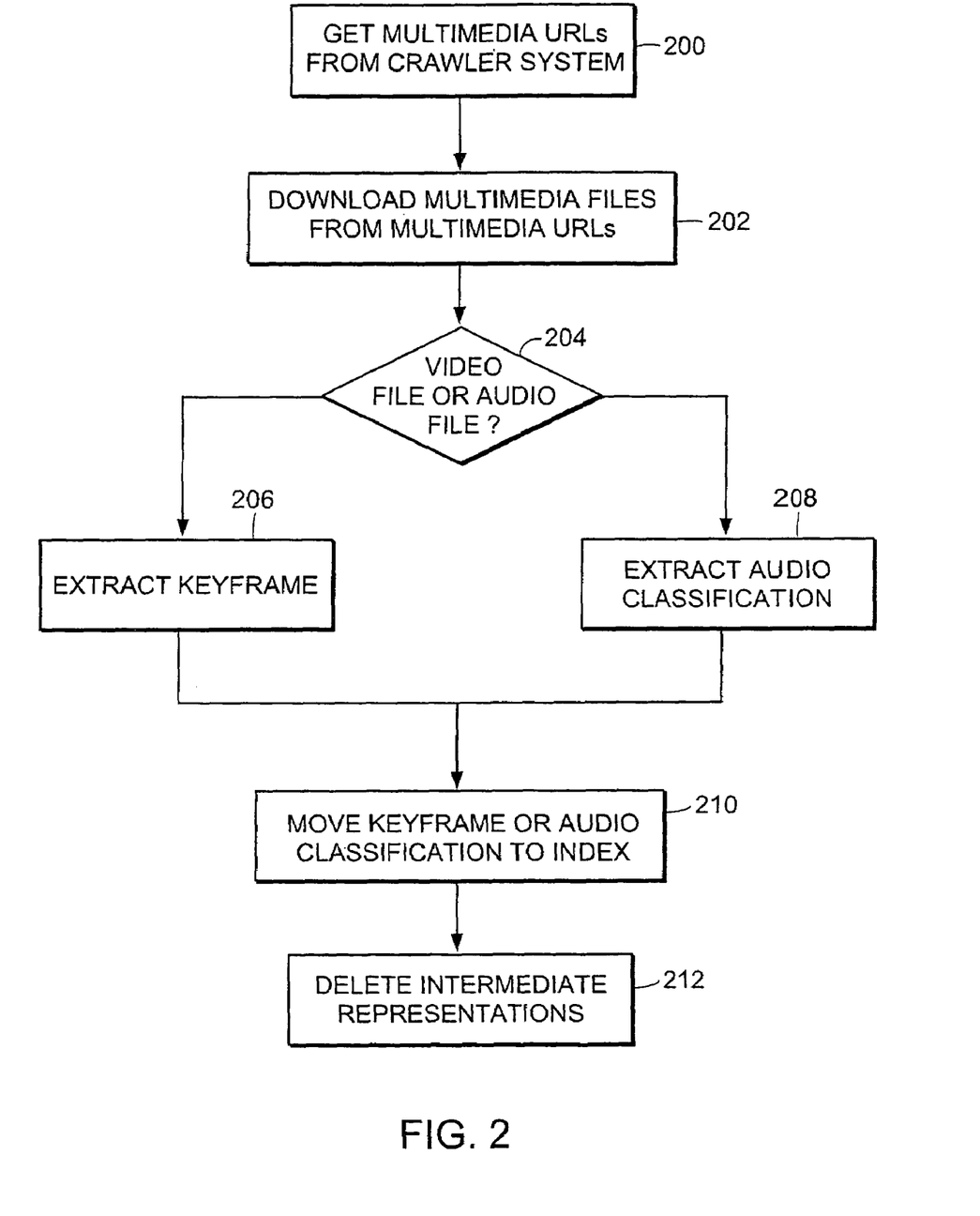
FIG. 2 is a flowchart showing the steps for creating an index of multimedia files including the file's URL and a key frame.

In step 200 in FIG. 2, a starter daemon 104 in the multimedia index system 100 periodically checks to see if the crawler system has identified multimedia URLs to be downloaded. If there are multimedia URLs to be downloaded, the starter daemon 104 downloads the multimedia URLs and relevant text from the crawler system, and puts them into the librarian 108. The addition of multimedia URLs to the librarian 108 by the starter daemon 104 creates work for a getter daemon 106. In step 202, a getter daemon 106 periodically checks with the librarian 108 to determine if there are multimedia URLS to be processed. The getter daemon 106, using the multimedia URLs downloaded by the starter daemon 104, downloads the multimedia files.

In step 204, if the multimedia file is a video file, the getter daemon 106 adds work to the librarian 108 for the keyframer daemon 110. If the multimedia file is an audio file the getter daemon 106 adds work to the librarian 108 for the audio classification daemon.

In step 208, the audio classification daemon periodically polls the librarian 108 to determine if there are requests for classification of an audio file. The audio classification daemon analyzes the audio file, and classifies the audio file as either music or speech, and stores the classification with the audio file and the audio file's URL in the media server 114.

In step 206, the keyframer daemon 110 periodically polls the librarian 108 to determine if there are requests for generating a representation for a video file. The keyframer daemon analyzes the video file and extracts a representation from the video file. The representation extracted is a key frame. After the key frame is extracted, the keyframer daemon 110 adds work to the librarian 108 for the mover daemon 116 and the reaper daemon 120.

In step 210, the mover daemon 116 periodically polls the librarian 108 for work. Finding work created by the audio classification daemon 112 or the keyframer daemon 110, the mover daemon 116 moves the audio classification produced by the audio classification daemon or the keyframe produced by the keyframer daemon 110 to the index of multimedia files 118 which is available to the web server 124. In step 212, the reaper daemon 120 periodically polls the librarian 108 for work. Finding work created by the keyframer daemon 110, the reaper daemon 120 deletes the video file representative text and URL downloaded by the starter daemon 104 and the video file downloaded by the getter daemon 106. These files and representations are no longer required by the multimedia system because all work depending on them has been completed.

Keyframer Daemon

Figure 3:
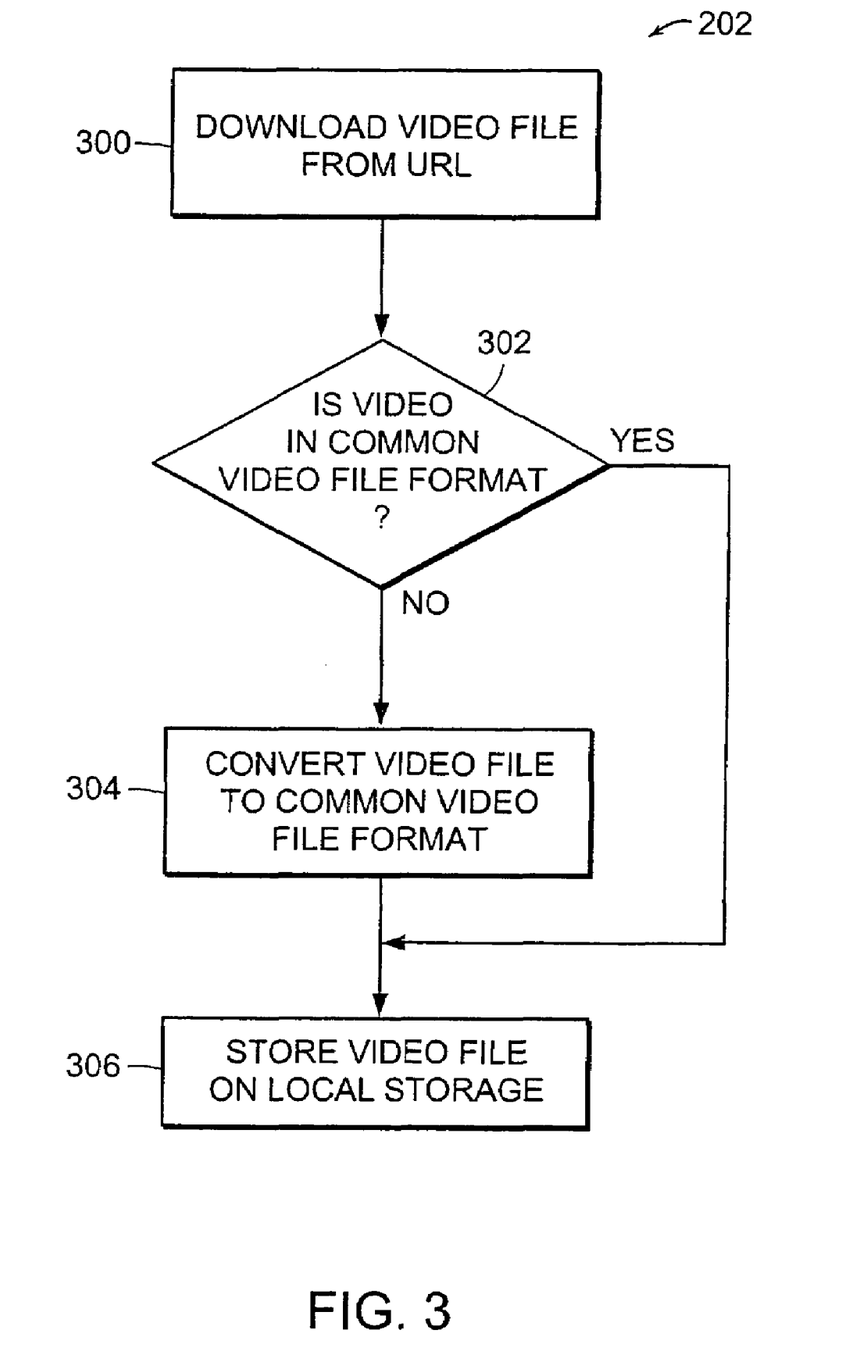
FIG. 3 is a flowchart showing the steps for the step of downloading multimedia files shown in FIG. 2.

Step 202 is described in greater detail relative to FIG. 3. In step 300, in FIG. 3 the getter daemon 106 downloads a multimedia file from the multimedia URL as discussed in conjunction with FIG. 2. After the multimedia file has been downloaded, in step 302 the getter daemon 106 determines the format of the multimedia file. Digital video files linked to web pages may be in many different formats, including Audio Video Interleave ("AVI"), Advanced Streaming Format ("ASF"), RealAudio, MPEG and Quicktime. The getter daemon 106 transcodes the digital video files to a common digital video format, for example, AVI format. After the transcoding, the getter daemon 106 stores the common format digital video file and a meta-data file for the digital video file. The meta-data file includes information on the digital video file, such as the title, author, copyright and video frame rate. In step 306 the meta-data file and the common video format file are stored on local storage.

Figure 4:
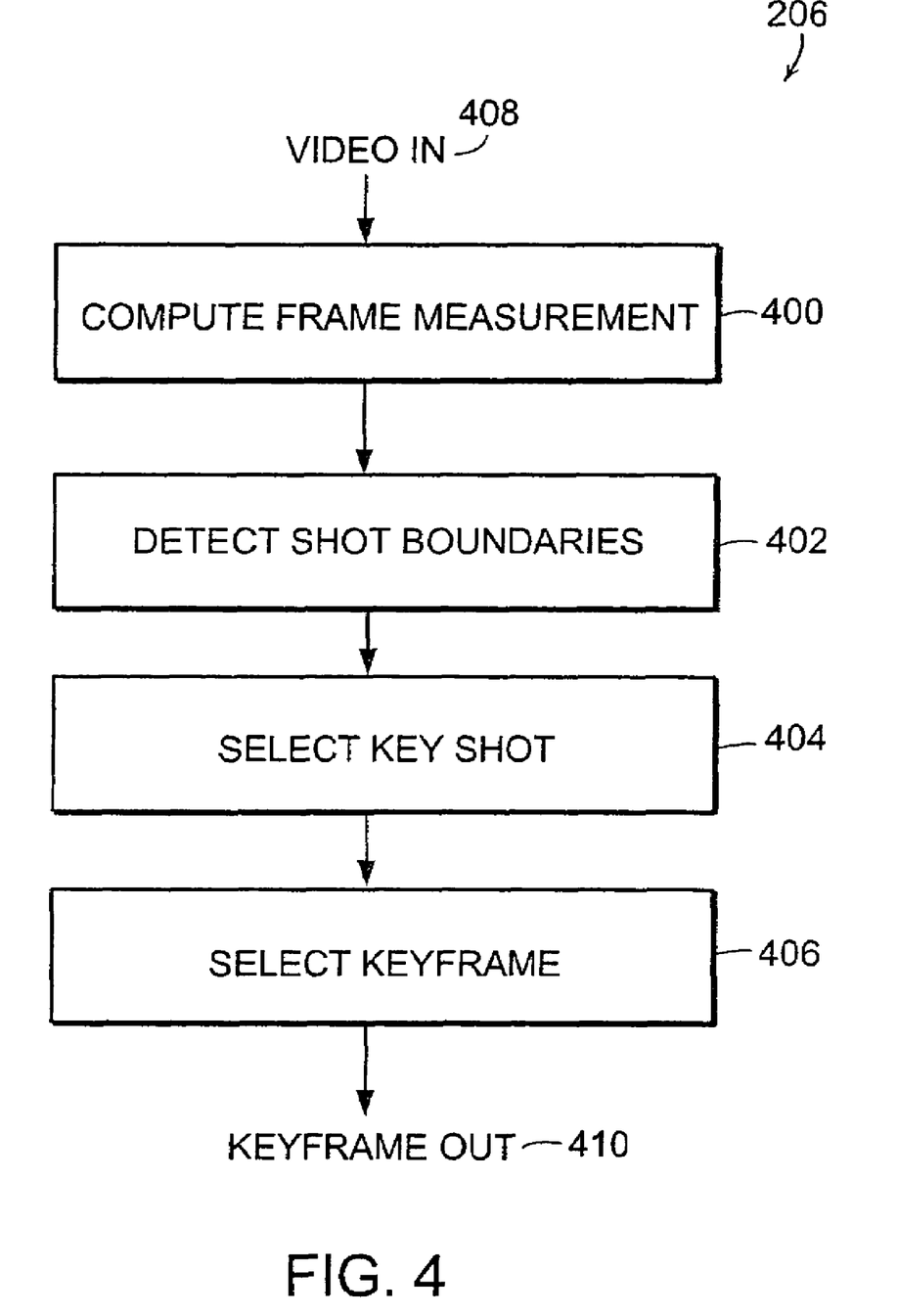
FIG. 4 is a flowchart showing the steps for the step of extracting a key frame shown in FIG. 2.

Step 206 in FIG. 2 is described in greater detail relative to FIG. 4. FIG. 4 illustrates a high level flowchart showing the steps the keyframer daemon 110 performs to select a key frame for the video sequence in common video format. In step 400 a number of measures are computed and stored for every frame in the video sequence. The measures include motion, spatial activity(entropy) and skin color. The sequence of frames may be grouped into a sequence of shots. A shot is a sequence of frames resulting from a continuous operation of the camera in which there is no significant change between pairs of successive frames. In step 402 shot boundaries are detected in the video sequence. A shot boundary is detected by detecting a significant change between successive frames. The shot boundaries are detected dependent on the measures computed in step 400. After the shot boundaries have been detected, a most interesting shot is selected from the video sequence in step 404 dependent on measures including motion activity, entropy, skin color and length of the shot. After the shot has been selected, a key frame is selected from within the selected shot in step 406 dependent on measures including motion activity and entropy.

Figure 5:
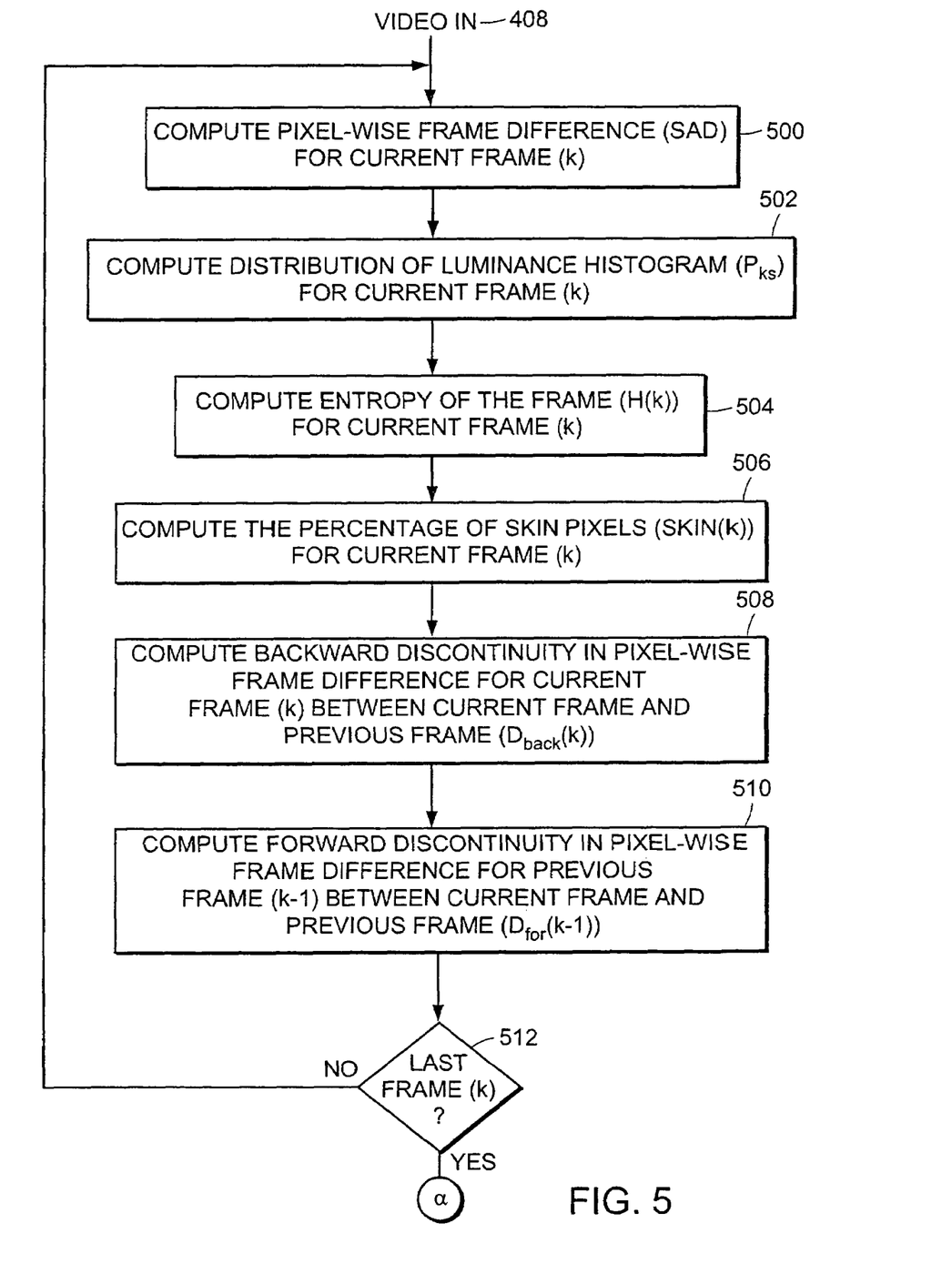
FIG. 5 is a flowchart showing the steps for the step of computing frame measurements shown in FIG. 4.

Step 400 in FIG. 4 is described in greater detail relative to FIG. 5. FIG. 5 illustrates the measures that are computed for each frame in order to select a key frame from a digital video file. Successive frames in the same shot in a digital video file have the same or continuously varying camera viewpoint with the only difference between the frames being due to object motion or camera action. An object motion may, for example, be a person walking and a camera action may be a pan or a zoom results in changes in successive frames. In step 500 a pixel-wise frame difference number is calculated for each frame. A measure of the amount of difference between pixels in successive frames may be used to determine a shot boundary in the digital video file. The pixel-wise frame difference number is computed by calculating the difference in intensity between a pixel in the current frame and the intensity of the same pixel in the previous frame and adding the absolute value of the differences of all pixels. For successive frames in a shot, the pixel-wise frame difference is a low value because the number of pixels that change from frame to frame is low. A high value of pixel-wise frame difference indicates a possible shot boundary. The following equation is used to compute the pixel-wise frame difference number.

$$SAD(k) = \sum_{i,j} |I(i, j, k) - I(i, j, k-1)|$$

where:
I(i, j, k) denotes the image intensity at pixel location (i, j) in frame k of the sequential frames.
I(i, j, k−1) denotes the image intensity at pixel location (i, j) in frame k−1 of the sequential frames.
SAD(k) denotes the Sum of Absolute Difference of the intensity of all pixels in frame k and frame k−1.

The pixel-wise frame difference value is susceptible to false detection of shot boundaries because it is sensitive to rapid changes in movement. In step 502 another measure of motion activity is computed to reduce false detections of shot boundaries based on pixel-wise intensity difference. This measure of activity is based on a luminance histogram for the frame, that is, a plot of the luminance distribution in the frame, in which each pixel has a luminance value between 0 and 255. The cumulative distribution of the luminance histogram for the current frame and the previous frame are compared. The Kolmogorov-Smirnov statistical test, a well known test in statistics, is used to compute the probability that the distribution of luminance histograms of frame k and frame k−1 are the same.

$$D(k) = \max_{x} |(CD(x, k) - CD(x, k-1))|$$

$$Q_{KS}(\lambda) = 2\sum_{j=1}^{\infty} (-1)^{(j-1)} e^{-2j^2\lambda^2}$$

$$P_{KS}(k) = Q_{KS}(\sqrt{N/2} * D(k))$$

where:
k is a frame
x is the gray level value (x ∈ [0, 255])
CD(x,k) is the cumulative distribution of the luminance histogram for frame k
$P_{ks}(k)$ is the probability that the distribution of luminance histograms of frame k and frame k−1 are the same.

Figure 6A:
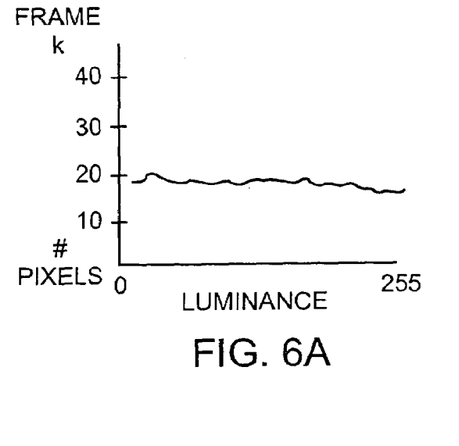
FIGS. 6A-6E illustrate luminance histograms and $P_{ks}$ measurements measured in steps described in conjunction with FIG. 5.
Figure 6B:
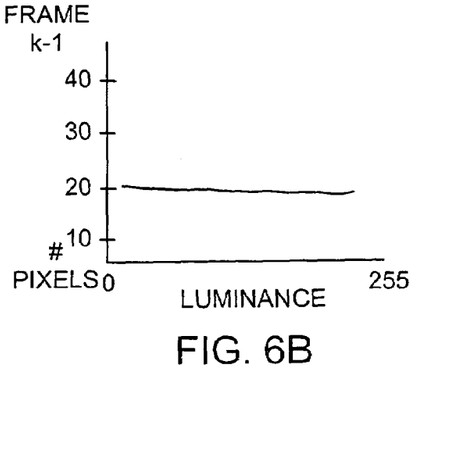
Figure 6C:
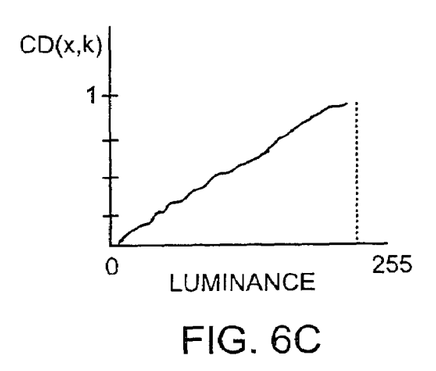
Figure 6D:
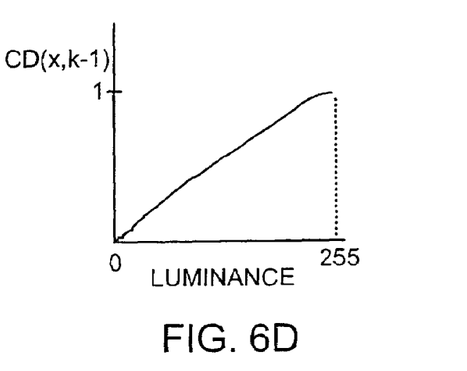
Figure 6E:
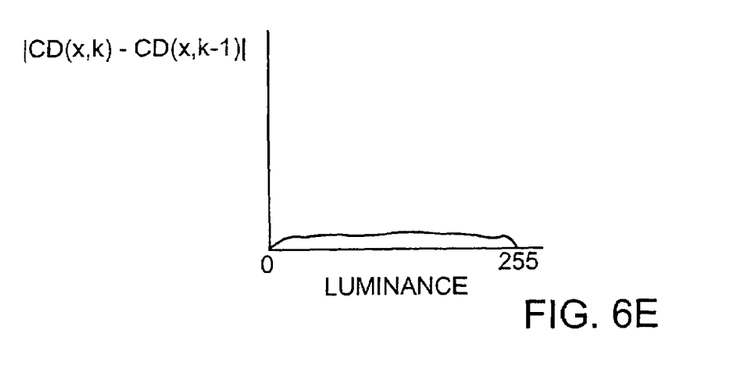

In FIG. 6A a luminance histogram is shown for frame k. The number of pixels is on the y-axis. The pixel luminance values are on the x-axis. In FIG. 6B a luminance histogram is shown for frame k−1. As can be seen, the histograms for frame k−1 and frame k differ slightly for a number of pixel intensities. In FIG. 6C the cumulative distribution of luminance for frame k is shown. FIG. 6D shows the cumulative distribution of luminance for frame k−1. As can be seen in FIG. 6E the difference between the cumulative distribution of luminance for frame k and the cumulative distribution of luminance for frame k−1 is small. $P_{ks}$ is a single number computed for the frame with a value between 1 and 0 dependent on the Kolmogorov-Smirnov statistical test.

In step 504 in FIG. 5 a measure of spatial activity is computed for the frame. The measure of spatial activity is measured by the entropy of a frame using the equation below:

$$H(k) = -\sum_{x} p(x, k)\log_2(p(x, k))$$

where:
p(x, k) is the probability of the gray-level value x in the luminance histogram of frame k.

A high value of entropy indicates a frame with a high spatial content. A frame with a high spatial content has a flat histogram because the pixel luminance is spread out amongst all the possible pixel luminance values. A frame with a low spatial content has a histogram in which the luminance of all pixels centers around the same luminance creating a histogram with a peak. For example, a frame including a boat in a lake on a cloudless day would have a histogram with a large portion of pixels centering around the color blue.

In step 506 a measure of the percentage of skin pixels is computed from a color histogram of the frame pixels. The color of each pixel in the frame is compared to a known distribution of skin-like or human flesh color. This measure is useful to indicate a frame likely to include skin, for example, to select a frame in a digital video file showing humans.

In steps 508 and 510 a measure of forward and backward discontinuity is computed based on the pixel-wise frame difference between successive frames. The forward discontinuity measure is the difference between the current frame's pixel-wise frame difference and the next frame's pixel-wise frame differences. The current frame's pixel-wise difference may also be compared with more than one next frame's pixel wise frame difference and the maximum difference selected as the forward discontinuity. The equation is shown below:

$$D_{for}(k) = \max_{i} (SAD(k) - SAD(i)) \quad i = k+1, \ldots, k+m$$

where:
k is the current frame
$D_{for}$ is the forward discontinuity
typically m=1 or 2.

A measure of backward discontinuity is the difference between the current frame's pixel-wise frame difference and the previous frame's pixel-wise frame difference. The current frame's pixel-wise difference may also be compared with greater than one previous frame's pixel-wise frame difference and the maximum difference selected as the backward discontinuity. The equation is shown below:

$$D_{back}(k) = \max_{i} (SAD(k) - SAD(i)) \quad i = k-m, \ldots, k-1$$

where:
$D_{back}$ is the backward discontinuity
k=current frame.
typically m=1 or 2.

Figure 7:
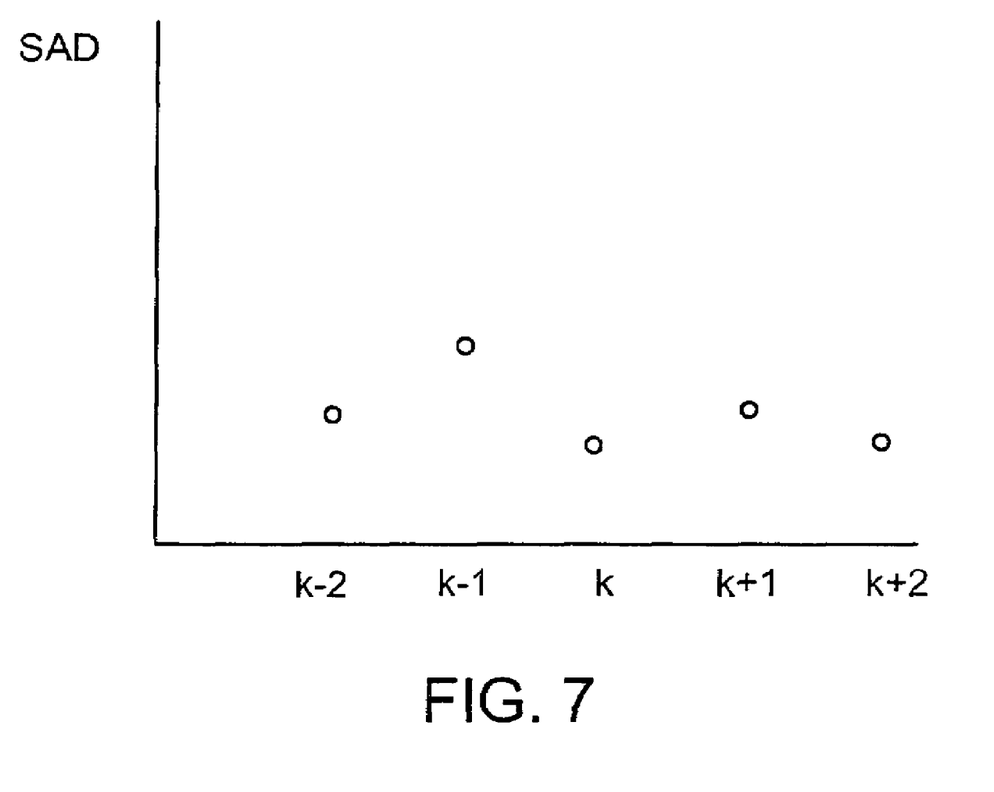
FIG. 7 illustrates SAD values between successive frames measured in steps described in conjunction with FIG. 5.

FIG. 7 illustrates a graph of pixel-wise difference values for successive frames k. Having computed all necessary measures for the individual frames required for detection of shot boundaries and key shots, the system proceeds as follows.

Figure 8:
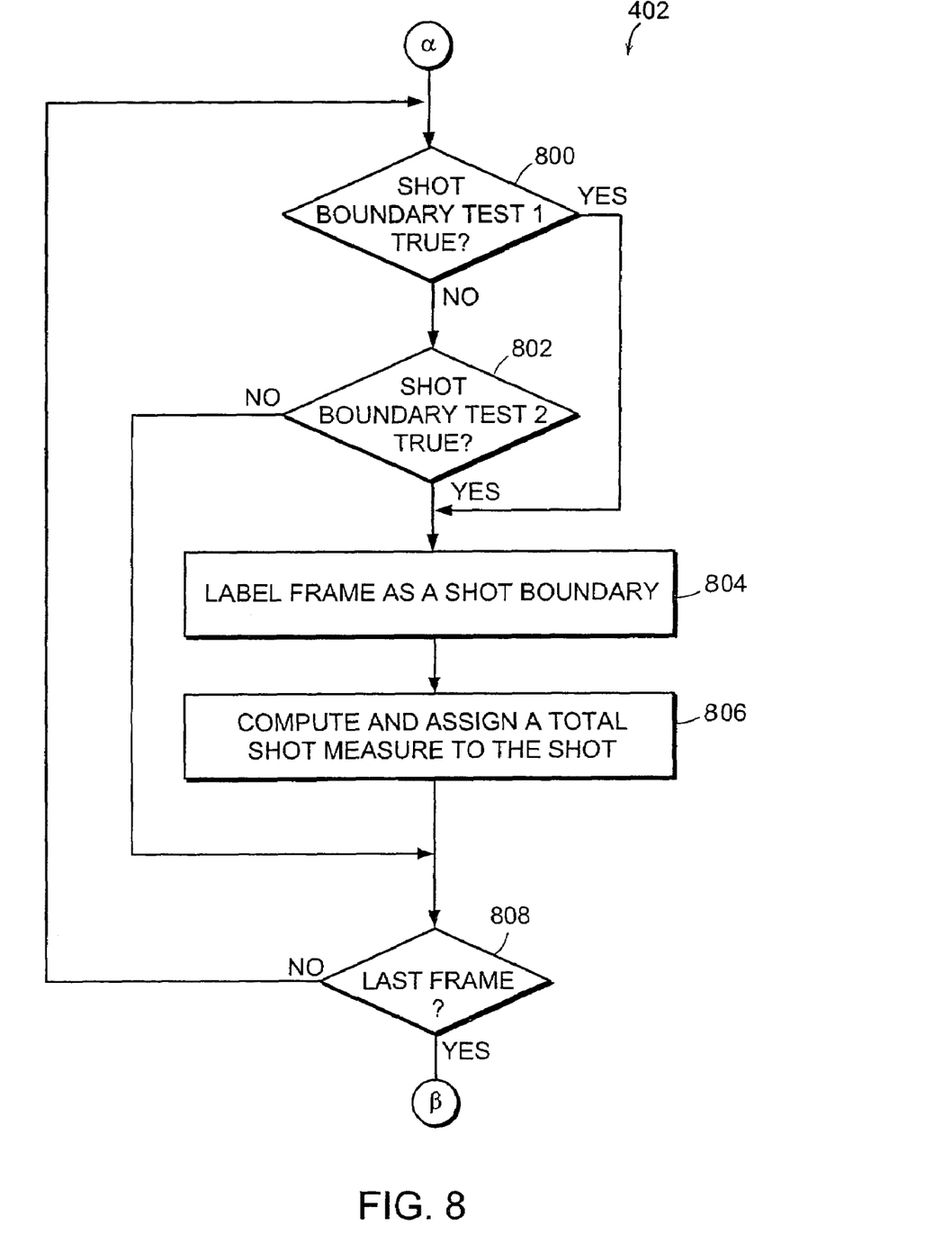
FIG. 8 is a flowchart showing the steps for the step of detecting shot boundaries shown in FIG. 4.

Step 402 in FIG. 4 is described in greater detail relative to FIG. 8. FIG. 8 illustrates the steps for detecting shot boundaries in the digital video file. Two tests are used to determine if the current frame is a shot boundary. In step 800 test1 is applied using the frame measurements computed in the steps illustrated in FIG. 5. Test1 performs the following test:

$$\max(D_{back}(k), D_{for}(k))/P_{KS}(k) > 2*\sigma$$

where:

σ is the standard deviation of the pixel-wise frame difference.

Although the test relies on a ratio of $D_{for}$, $D_{back}$, and $P_{KS}$ the test may be performed on either one.

Figure 9A:
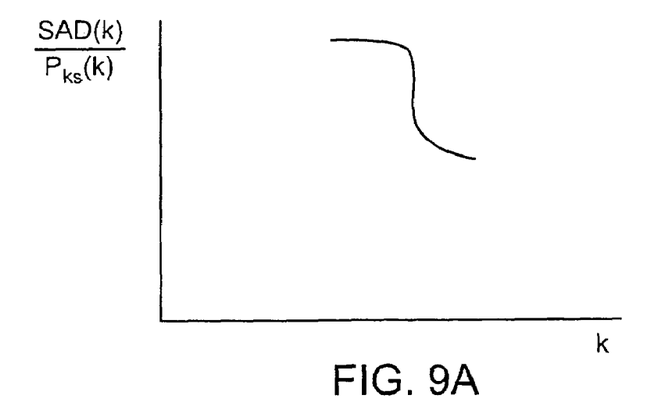
FIGS. 9A-C are flowcharts showing the steps for the step of selecting a key shot shown in FIG. 4.
Figure 9B:
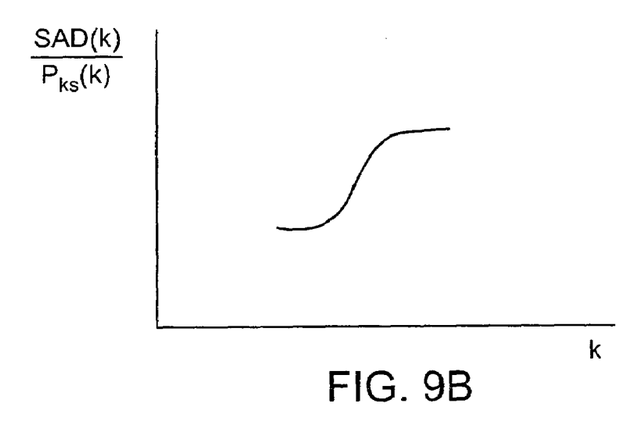
Figure 9C:
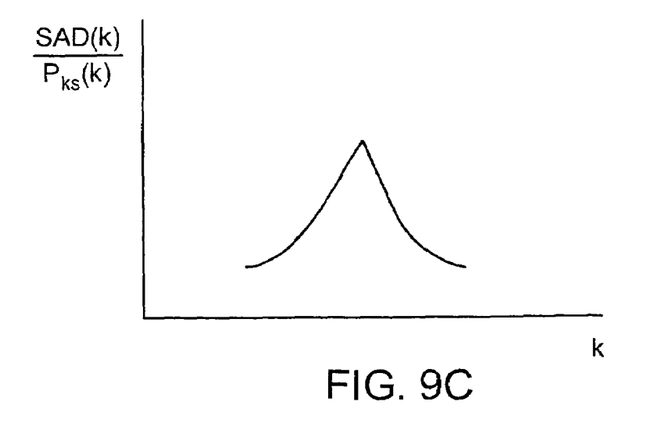

FIGS. 9A-9C illustrate the type of shot boundaries detected by the two tests. The frames k are on the x-axis. A value dependent on the pixel-wise frame difference on the $P_{ks}$ is on the y-axis. As shown in FIG. 9A, test1 detects a shot boundary between frames with a small $D_{back}$ followed by frames with a large $D_{for}$. This type of shot boundary occurs when a shot with high motion activity is followed by a shot with low motion activity. As shown in FIG. 9B, test1 also detects a shot boundary between frames with a large $D_{back}$ followed by frames with a small $D_{for}$. This type of shot boundary occurs when a shot with a low motion activity is followed by a shot with high motion activity. If a shot boundary is not detected using test1 a second test, test2 is performed in step 602. Test2 is applied using the frame measurements computed in the steps illustrated in FIG. 5. Test2 performs the following test:

$$\max(D_{back}(k), D_{for}(k))/P_{KS}(k) > \sigma \text{ and}$$

$$\min(D_{back}(k), D_{for}(k))/P_{KS}(k) > \sigma/2$$

where:

σ is the standard deviation of the pixel-wise frame difference.

Test2 detects a shot boundary looking at both the maximum and the minimum thresholds for $D_{back}$ and $D_{for}$. The max threshold is less than in test 1 because of a higher confidence in detecting a peak (minimum and maximum value) instead of a step (minimum or maximum value). FIG. 9C illustrates a low motion activity shot followed by another low motion activity shot. Test2 detects this shot boundary.

If test1 or test2 is true the frame is labeled as a shot boundary in step 804. Having reached the end of a shot the total measure of the shot is computed in step 806. The total measure of the shot preceding the shot boundary is computed to determine a measure of how interesting the shot is. Interesting shots may be determined by the amount of skin colored pixels, the entropy, the amount of motion activity and the length of the shot. The amount of skin colored pixels is used to determine the most interesting shot because typically the most interesting shot in the digital video is the shot with humans in it. The entropy is used to determine the most interesting shot because a shot with a low distribution of pixel intensity typically does not have a lot of objects in it. The amount of motion activity is used to determine the most interesting shot because shots with a lot of motion activity indicate that they are important to the digital video. The length of the shot is used to determine the most interesting shot in a digital video because typically the camera will stop at a position longer at an interesting shot The factors to compute an interesting shot may be given weights to reduce the emphasis on one or more of the measures dependent on the type of digital video file. For example, a digital video with a lot of motion activity in all shots may reduce the emphasis on motion so as to select the most interesting shot from other parameters. The equation for computing the total shot measure is shown below:

$$M_s = w_H \text{avgH}/\sigma + w_{Skin} \text{avgSkin}/\sigma_{Skin} + w_{medSAD} \text{medSAD}/\sigma_{medSAD} + w_T T/\sigma_T$$

where:

avgH is the average of entropy of all frames in the shot.

avgSkin is the average of skin pixels percentage of all frames in the shot.

medSAD is the median of pixel-wise frame difference in all frames in the shot.

$M_s$ is the total measure of the shot

T is the length of the shot expressed in seconds.

$\sigma_{skin}$ $\sigma_{medSAD}$, $\sigma_T$ and $\sigma_H$ are the standard deviations of $\text{avg}_H$, $\text{avg}_{Skin}$, $\text{med}_{SAD}$ and T respectively computed on a training set.

$w_H$, $w_{skin}$, $w_{medSAD}$, $w_T$ are weighting factors for H, Skin, SAD and T.

Figure 10:
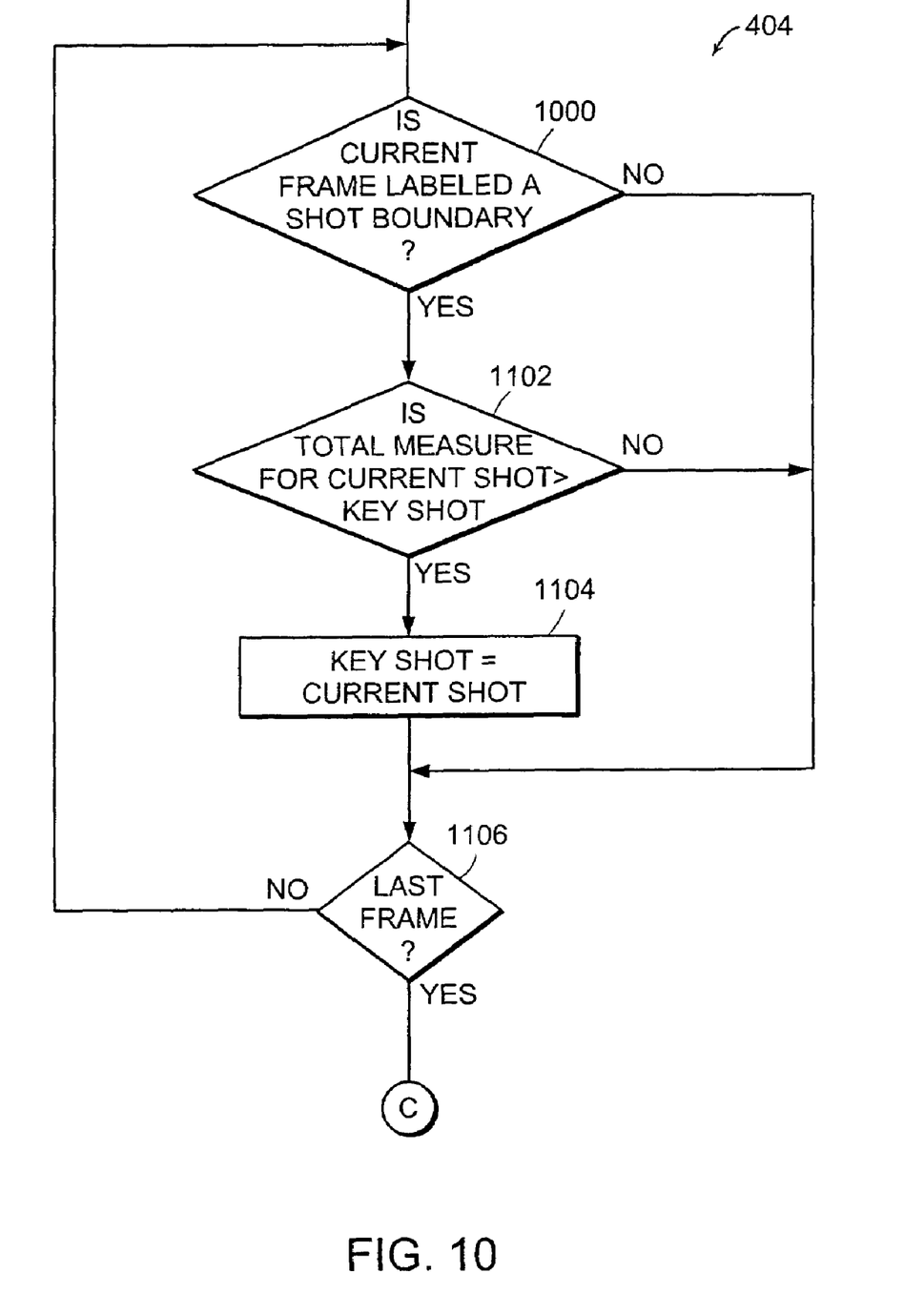
FIG. 10 shows the thresholds detected in shot boundary tests shown in the flowchart in FIG. 5.

Step 404 in FIG. 4 is described in greater detail relative to FIG. 10. Knowing the shot boundaries and the total measure for each shot, the most interesting shot is selected as the shot having the largest total measure using the steps illustrated in FIG. 10. In step 1000 if the current frame in the video file is not a last frame in step 1006 the next frame is checked in step 1000. If in step 1000 the current frame in the video file is a shot boundary in step 1002, the total measure of the current shot in step 1002 is compared to the total measure of the previous shot. If the total measure of the current shot is greater than the total measure of the previous shot in step 1006, the total measure for the current shot is selected as the key shot. All frames in the video file are checked for shot boundaries until the last frame is reached. The total measure of all shots in the video file are compared and the shot with the highest total measure is selected as the most interesting shot in the video file.

Figure 11:
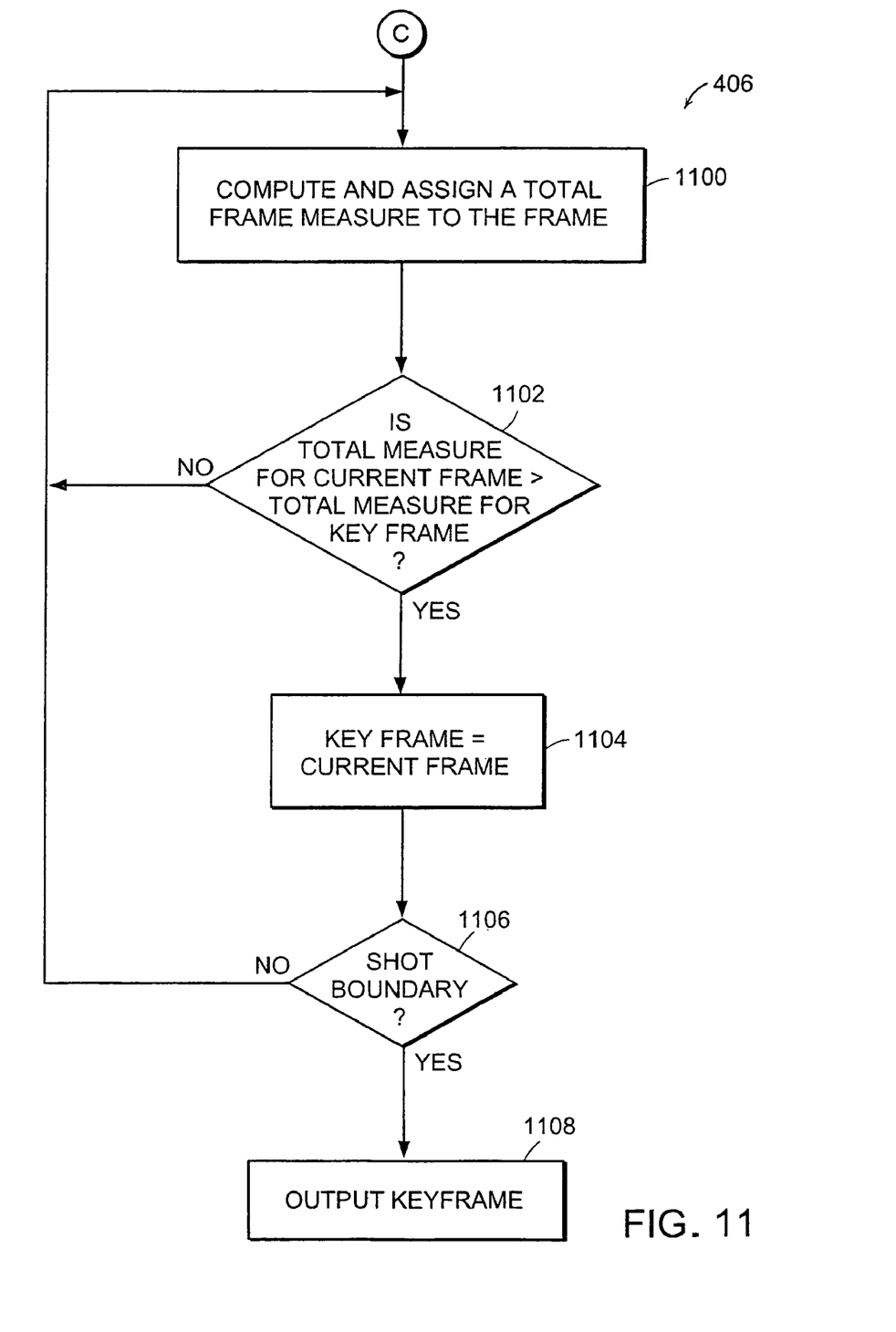
FIG. 11 is a flowchart showing the steps for the step of selecting a key frame shown in FIG. 4.

Step 406 in FIG. 4 is described in greater detail relative to FIG. 11. FIG. 11 illustrates the steps for selecting the most representative frame from the most interesting shot. In step 1100 a total measure for the frame is computed from the entropy of the frame and the pixel-wise frame difference calculated for the frame. The total measure of the frame favors the frame in the shot with the least motion activity because selecting a frame with the most motion may result in the display of a fuzzy frame due to the motion. Motion is not captured well by compression algorithms often used on the digital video file located on the WWW. The equation for selecting the total frame measure is provided below:

$$M_f = W_H H(k)/\sigma_H - W_{SAD} \text{SAD}(k)/\sigma_{SAD}$$

where:

$M_f$ is the total frame measure.

H(k) is the entropy of frame k.

SAD(k) denotes the Sum of Absolute Difference of the intensity of all pixels in frame k and frame k−1.

$\sigma_H$ is the standard deviation of H computed on a training set.

$\sigma_{SAD}$ is the standard deviation of SAD computed on a training set.

$w_H$, $w_{SAD}$ are weighing factors for H and SAD.

The most interesting frame within the most interesting shot is the frame with the greatest amount of entropy relative to the amount of motion, that is, the space having the greatest frame measure value $M_f$ computed above. In step 1102 the total frame measure of the current frame in the most interesting shot is compared with the total measure of the key frame in the most interesting shot. If the total frame measure is greater than the total frame measure for the key frame the current frame is selected as the key frame for the shot in step 1104. If the current frame total measure is not greater than the key frame total measure the total measure of the next frame is compared to the key frame in step 1100. Total frame measures for all the frames in the shot are compared in order to select the frame with the greatest total frame measure as the key frame. In step 1108 when the shot boundary is detected the key frame for the most interesting slot in the video file is output in step 1108.

Returning to FIG. 2 after the key frame has been output from the keyframer daemon 110 in step 206 the mover daemon 116 moves the key frame to the index of multimedia files 118 in step 210. In step 212 the reaper daemon 120 deletes the common format video file.

In another embodiment of the present invention more than one keyframe may be output by selecting a keyframe from each of a number of the most interesting shots.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of extracting a single representative key frame from a sequence of frames, the sequence of frames including a plurality of shots, comprising the steps of:
    detecting shot boundaries in the sequence of frames to identify shots within the detected shot boundaries;
    selecting from the identified shots a single most interesting shot representative of the sequence of frames based on shot length;
    selecting the single representative key frame in the selected most interesting shot; and
    wherein the detecting shot boundaries, the selecting from the identified shots, and the selecting the single representative key frame are performed by an apparatus.

2. A method as claimed in claim 1 wherein the step of detecting shot boundaries is based on pixel-wise frame difference.

3. A method as claimed in claim 2 wherein the step of detecting shot boundaries is based on distribution of a luminance histogram.

4. A method as claimed in claim 3 wherein the step of detecting shot boundaries is based on luminance.

5. A method as claimed in claim 4 wherein the step of detecting shot boundaries is based on a discontinuity in pixel-wise frame difference.

6. A method as claimed in claim 5 wherein the step of detecting shot boundaries is dependent on the result of a first test to determine if the maximum of a forward discontinuity in pixel-wise frame difference and a backward discontinuity in pixel-wise frame difference relative to a distribution of a luminance histogram is greater than a first threshold value.

7. A method as claimed in claim 6 wherein the step of detecting shot boundaries is dependent on the result of a second test to determine if the maximum of a forward discontinuity in pixel-wise frame difference and a backward discontinuity in pixel-wise frame difference relative to a distribution of a luminance histogram is greater than a second threshold value, which is less than the first threshold, and the minimum of a forward discontinuity in pixel-wise frame difference and a backward discontinuity in pixel-wise frame difference relative to a distribution of a luminance histogram is less than a third threshold value which is less than the second threshold.

8. A method as claimed in claim 1 wherein the step of selecting a single most interesting shot is based on level of skin color pixels.

9. A method as claimed in claim 8 wherein the step of selecting a single most interesting shot is based on motion between frames.

10. A method as claimed in claim 8 wherein the step of selecting a single most interesting shot is based on spatial activity within frames.

11. A method as claimed in claim 8 wherein the step of selecting a single most interesting shot is based on motion between frames, spatial activity within frames, and level of skin pixels.

12. A method as claimed in claim 1 wherein the step of selecting a key frame is based on frame activity.

13. A method as claimed in claim 12 wherein the step of selecting a key frame based on spatial activity within frame.

14. A method as claimed in claim 12 wherein the step of selecting a key frame is based on motion between frames.

15. A method of selecting a single most interesting multi-frame shot from a sequence of multi-frame shots comprising:
    determining a level of skin pixels having a human flesh color of individual frames in each multi-frame shot;
    selecting the most interesting multi-frame shot representative of the sequence of multi-frame shots based on the level of skin pixels; and
    wherein the determining and the selecting are performed by an apparatus.

16. A method as claimed in claim 15 wherein the single most interesting shot is selected based on motion between frames.

17. A method as claimed in claim 15 wherein the single most interesting shot is selected based on spatial activity within frames.

18. A method as claimed in claim 15 wherein the single most interesting shot is selected based on shot length.

19. A method as claimed in claim 15 wherein the single most interesting shot is selected based on motion between frames, spatial activity within frames and shot length.

20. A method of selecting a single representative key frame from a sequence of frames, the sequence of frames including a plurality of shots, comprising:
    selecting a single most interesting shot representative of the sequence of frames from the plurality of shots based on shot length;
    determining frame activity of individual frames;
    selecting the key frame from the most interesting shot based on the frame activity; and
    wherein the selecting a single most interesting shot, the determining frame activity, and the selecting the key frame are performed by an apparatus.

21. A method as claimed in claim 20 wherein the frame activity is based on spatial activity within each frame.

22. A method as claimed in claim 20 wherein the frame activity is based on motion between frames.

23. An apparatus for extracting a key frame from a sequence of frames, comprising:
    a keyframe extractor routine;
    means, within the keyframe extractor routine, for detecting shot boundaries in the sequence of frames to identify shots within the detected shot boundaries;
    means, within the keyframe extractor routine, for selecting a single most interesting shot representative of the sequence of frames from the identified shots within based on shot length; and
    means, within the keyframe extractor routine, for selecting the key frame in the selected most interesting shot.

24. An apparatus as claimed in claim 23 wherein the means for detecting shot boundaries is based on pixel-wise frame difference and distribution of a luminance histogram.

25. An apparatus as claimed in claim 23 wherein the means for selecting a single most interesting shot is based on motion between frames, and spatial activity within frames and, level of skin pixels.

26. An apparatus as claimed in claim 23 wherein the means for selecting a key frame is based on frame activity.

27. An apparatus for extracting a single representative key frame from a sequence of frames, the sequence of frames including a plurality of shots, comprising:
- a keyframe extractor routine responsive to a request for extracting a key frame from the sequence of frames, the extractor comprising:
- a shot boundary detector detecting boundaries in the sequence of frames identify shots within the detected shot boundaries;
- a key shot selector which selects a single most interesting shot representative of the sequence of frames from the identified shots is based on shot length; and
- a key frame selector which selects a key frame in the selected most interesting shot.

28. An apparatus as claimed in claim 27 wherein the shot boundary detector detects shot boundaries based on pixel-wise frame difference and distribution of a luminance histogram.

29. An apparatus as claimed in claim 27 wherein the key shot selector selects the most interesting shot based on motion between frames, spatial activity within frames, level of skin pixels.

30. An apparatus as claimed in claim 27 wherein the key frame selector selects the most interesting frame based on frame activity.

31. A computer system comprising:
- a memory system; and
- a keyframe extractor routine located in the memory system responsive to a request for extracting a single representative key frame from a sequence of frames, the sequence of frames including a plurality of shots, which:
- detects shot boundaries in the sequence of frames to identify shots within the detected shot boundaries;
- selects a single most interesting shot representative of the sequence of frames from the identified shots based on shot length; and
- selects the key frame in the selected most interesting shot.

32. A computer system as claimed in claim 31 wherein the keyframe extractor detects shot boundaries based on pixel-wise frame difference and distribution of a luminance histogram.

33. A computer system as claimed in claim 31 wherein the keyframe extractor selects the most interesting shot based on motion between frames, spatial activity within frames, and level of skin pixels.

34. A computer system as claimed in claim 31 wherein the keyframe extractor selects the key frame based on frame activity.

* * * * *

UNITED STATES PATENT AND TRADEMARK OFFICE
CERTIFICATE OF CORRECTION

| | |
|---|---|
| PATENT NO. | : 7,643,657 B2 |
| APPLICATION NO. | : 10/899838 |
| DATED | : January 5, 2010 |
| INVENTOR(S) | : Frederic Dufaux et al. |

Page 1 of 1

It is certified that error appears in the above-identified patent and that said Letters Patent is hereby corrected as shown below:

In column 10, line 61, in Claim 23, after "shots" delete "within".

In column 11, line 19, in Claim 27, delete "selects a" and insert -- selects the --, therefor.

In column 11, line 27, in Claim 29, before "level" insert -- and --.

Signed and Sealed this

Fifteenth Day of June, 2010

David J. Kappos
*Director of the United States Patent and Trademark Office*